United States Patent
Kushioka et al.

(10) Patent No.: US 11,160,044 B2
(45) Date of Patent: Oct. 26, 2021

(54) SYNCHRONIZATION SIGNAL CONVERSION DEVICE

(71) Applicant: HITACHI KOKUSAI ELECTRIC INC., Tokyo (JP)

(72) Inventors: Yoichi Kushioka, Tokyo (JP); Koji Yotsumoto, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/273,565

(22) PCT Filed: Aug. 22, 2019

(86) PCT No.: PCT/JP2019/032829
§ 371 (c)(1),
(2) Date: Mar. 4, 2021

(87) PCT Pub. No.: WO2020/054344
PCT Pub. Date: Mar. 19, 2020

(65) Prior Publication Data
US 2021/0258906 A1   Aug. 19, 2021

(30) Foreign Application Priority Data
Sep. 10, 2018   (JP) .............................. JP2018-168533

(51) Int. Cl.
*H04W 56/00* (2009.01)
(52) U.S. Cl.
CPC ............... *H04W 56/0015* (2013.01)
(58) Field of Classification Search
None
See application file for complete search history.

(56) References Cited

FOREIGN PATENT DOCUMENTS

| JP | 2007-212162 A | 8/2007 | |
|----|---------------|--------|---|
| JP | 2014-239271 A | 12/2014 | |
| JP | 2016-39514 A | 3/2016 | |
| WO | 2016/194518 A1 | 12/2016 | |
| WO | 2018/101369 A1 | 6/2018 | |
| WO | WO-2018101369 A1 * | 6/2018 | ............ H04J 3/0661 |

OTHER PUBLICATIONS

International Search Report dated Nov. 19, 2019.

* cited by examiner

*Primary Examiner* — Ayanah S George
(74) *Attorney, Agent, or Firm* — Bacon & Thomas, PLLC

(57) ABSTRACT

A synchronization signal conversion device comprises a first communication device and a second communication device. The first communication device acquires, from the received GPS signals, time synchronization information synchronized to a GPS reference time, and wirelessly transmits the time synchronization information at a frequency different from that of the GPS signals. The second communication device receives the radio signals from the first communication device and acquires the time synchronization information, synchronizes internal time information to the GPS reference signal on the basis of the time synchronization information, and generates pseudo-GPS reception signals including satellite information and outputs the signal to a reception-side base station device such that the synchronized internal time information and pre-stored position information are acquired at the base station device.

9 Claims, 9 Drawing Sheets

SYNCHRONIZATION SIGNAL CONVERSION DEVICE

TECHNICAL FIELD

The present invention relates to a synchronization signal conversion device, and more particularly, to a synchronization signal conversion device that allows a system using time information synchronized with a Global Positioning System (GPS) to be constructed even in an environment in which it is difficult to receive GPS signals or network signals, thereby increasing the degree of freedom of system construction.

BACKGROUND

<Conventional Case>

In wireless systems (conventional wireless communication systems) using time division duplex (TDD) methods such as code-division multiple access (CDMA), Worldwide Interoperability for Microwave Access (WiMAX), and the like, it is necessary to match communication timing between terminals and base stations throughout the system. To this end, the base station generates a synchronization signal synchronized with a Global Positioning System (GPS) reference time to control uplink/downlink communication timing, and thus systems synchronized with the GPS reference time are being realized.

<Base Station Device Equipped with GPS Reception Device: FIG. 9>

Here, a base station device equipped with a GPS reception device will be described with reference to FIG. 9. FIG. 9 is an explanatory diagram showing a schematic configuration of the base station device equipped with the GPS reception device.

As illustrated in FIG. 9, a base station device 9 includes a GPS antenna 101 and a GPS reception device 102.

The GPS antenna 101 receives GPS signals from GPS satellites and outputs GPS reception signals.

The GPS reception device 102 extracts a reference time expressed in Coordinated Universal Time (UTC) from the GPS signals received from the GPS antenna 101 to generate synchronization signals synchronized (time synchronization) with the corresponding reference time. In addition, the conventional base station device 9 is operated according to the corresponding synchronization signals to perform communication synchronized with the GPS reference time.

Further, the GPS reception device 102 acquires (calculates) position information on the basis of the GPS reception signals.

Here, in this specification, a signal transmitted from each of GPS satellites (satellites) is referred to as a "GPS signal," and a signal, in which GPS signals transmitted from a plurality of satellites received by the GPS antenna 101 are superimposed, is referred to as a "GPS reception signal."

That is, the GPS reception signal is a signal input to the GPS reception device 102, and the GPS reception device 102 acquires (calculates) time information synchronized with the UTC and current position information on the basis of the input GPS reception signal.

In an environment in which GPS signal reception is difficult, a structure in which time synchronization information is transmitted via a wired network defined by the Institute of Electrical and Electronics Engineers (IEEE) 1588 is used.

In addition, in the conventional wireless communication system using a TDD method, broadcast channel information transmitted from a base station to a terminal includes time synchronization information, and a base station device generates a synchronization signal using broadcast channel information from another base station in order to replace the GPS signal.

<Broadcast Channel Information on Communication System>

However, in a system using the Long-Term Evolution (LTE)/LTE-Advanced standard, which is a major system for mobile communication currently, and a fifth generation (5G) communication system, which is a next-generation system currently under review, time information is not included in standard broadcast channel information from a base station.

Therefore, the broadcast channel information is difficult to be used as a replacement for a GPS signal.

RELATED ART

Further, as related art for a synchronization signal conversion device, there is Japanese Patent Application Publication No. 2016-39514 "Synchronization Signal Conversion Device" (Patent Document 1).

Patent Document 1 discloses a synchronization signal conversion device that acquires a broadcast wave synchronization signal from a received broadcast wave, converts the broadcast wave synchronization signal into a synchronization signal of a pseudo-GPS signal, and generates and outputs a pseudo-GPS reception signal including the corresponding converted synchronization signal to a base station device equipped with a GPS reception unit so that a reference clock is generated in the base station device.

DOCUMENT OF RELATED ART

Patent Document 1: Japanese Patent Application Publication No. 2016-39514

As described above, in the system using Long-Term Evolution (LTE)/LTE Advanced standard and the fifth generation (5G) communication system, since the time information is not included in the broadcast channel information, there is a problem in that the base station device could not generate the synchronization signal using the broadcast channel information instead of a GPS signal and that it is difficult to establish synchronization of the communication system in an environment in which it is difficult to receive GPS signals or network signals.

In addition, in Patent Document 1, the fact that a first device, which is installed in an environment in which GPS signals may be received, receives GPS signals and retrieves time synchronization information, and transmits the corresponding time synchronization information to a second device, which is installed in an environment in which GPS signals may not be received, at a frequency different from that of the GPS signals, and that a second device synchronizes internal time information with the corresponding time synchronization information and generates and transmits pseudo-GPS reception signals from which the corresponding synchronized internal time information is acquired by a device at a receiving side, is not described.

SUMMARY

The present invention has been proposed in view of the above limitations and provides a synchronization signal conversion device that allows a system synchronized with a GPS reference time to be realized even in an environment in which it is difficult to receive GPS signals or network signals because the time information is not included in broadcast channel information, thereby increasing the degree of freedom of system construction.

In view of the above, in accordance with a first aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, and a wireless transmission unit configured to transmit radio signals having the time synchronization information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a GPS time information conversion unit configured to store specific position information in advance and generate pseudo-GPS reception signals including satellite information about a plurality of satellites to allow the base station to acquire time information corresponding to the synchronized internal time information and calculate the specific position information, and a pseudo-GPS reception signal transmission unit configured to output the pseudo-GPS reception signals to the base station.

In accordance with a second aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, a position information acquisition unit configured to calculate position information from the received GPS signals, and a wireless transmission unit configured to transmit radio signals having the time synchronization information and the position information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a position information acquisition unit configured to acquire the position information included in the received radio signals, a GPS time information conversion unit configured to generate pseudo-GPS reception signals including satellite information about a plurality of satellites to allow the base station to acquire time information corresponding to the synchronized internal time information and calculate the position information acquired by the position information acquisition unit, and a pseudo-GPS reception signal transmission unit configured to output the pseudo-GPS reception signals to the base station.

In accordance with a third aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, a position information acquisition unit configured to calculate position information from the received GPS signals, a satellite information acquisition unit configured to acquire satellite information from the received GPS signals, and a wireless transmission unit configured to transmit radio signals having the time synchronization information, the position information, and the satellite information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a position information acquisition unit configured to acquire the position information included in the received signals, a satellite information acquisition unit configured to acquire the satellite information included in the received signals, a GPS time information conversion unit configured to generate pseudo-GPS reception signals including satellite information about a plurality of satellites to allow the base station to acquire time information corresponding to the synchronized internal time information and calculate the position information acquired by the position information acquisition unit or generates pseudo-GPS reception signals including the synchronized internal time information and the satellite information acquired by the satellite information acquisition unit, and a pseudo-GPS reception signal transmission unit configured to output the pseudo-GPS reception signals to the base station.

Further, in the above-described synchronization signal conversion devices, the second communication device may be installed inside the base station.

Further, in the above-described synchronization signal conversion devices, the second communication device may wirelessly transmit the pseudo-GPS reception signals to the base station.

EFFECT OF THE INVENTION

In accordance with the first aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, and a wireless transmission unit configured to transmit radio signals having the time synchronization information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a GPS time information conversion unit configured to store specific position information in advance and generate pseudo-GPS reception signals including satellite information about a plurality of satellites to allow the base station to acquire time information corresponding to the synchronized internal time information and calculate the specific position information, and a pseudo-GPS reception signal transmission unit configured to output the pseudo-GPS reception signals to the base station. Therefore, even when the base station is installed in a place in which it is difficult to receive GPS signals, the communication system can be realized since the base station can generate the synchronization signals synchronized with the GPS reference time from the pseudo-GPS reception signals. Further, it is advantageous in that the degree of freedom of system construction can be increased and arbitrary position information can be set in the base station.

In accordance with the second aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, a position information acquisition unit configured to calculate position information from the received GPS signals, and a wireless transmission unit configured to transmit radio signals having the time synchronization information and the position information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a position information acquisition unit configured to acquire the position information included in the received radio signals, a GPS time information conversion unit configured to generate pseudo-GPS reception signals including satellite information about a plurality of satellites to allow the base station to acquire time information corresponding to the synchronized internal time information and calculate the position information acquired by the position information acquisition unit, and a pseudo-GPS reception signal transmission unit configured to output the pseudo-GPS reception signals to the base station. Therefore, even when the base station is installed in a place in which it is difficult to receive GPS signals, the communication system can be realized since the base station can generate the synchronization signals synchronized with the GPS reference time from the pseudo-GPS reception signals. Further, it is advantageous in that the degree of freedom of system construction can be increased and the first communication device can set the position information calculated from the GPS signals in the base station.

In accordance with the third aspect of the present invention, there is provided a synchronization signal conversion device including: a first communication device; and a second communication device, the second communication device being connected to a reception device of a base station. The first communication device includes a Global Positioning System (GPS) reception unit that receives GPS signals, a time information acquisition unit configured to acquire time synchronization information synchronized with a GPS reference time from the received GPS signals, a position information acquisition unit configured to calculate position information from the received GPS signals, a satellite information acquisition unit configured to acquire satellite information from the received GPS signals, and a wireless transmission unit configured to transmit radio signals having the time synchronization information, the position information, and the satellite information at a frequency different from that of the GPS signals. Further, the second communication device includes a wireless reception unit configured to receive the radio signals transmitted from the first communication device, a time information synchronization unit configured to synchronize internal time information in the second communication device with the GPS reference time on the basis of the time synchronization information included in the received radio signals, a position information acquisition unit configured to acquire the position information included in the received signals, a satellite information acquisition unit configured to acquire the satellite information included in the received signals, a GPS time information conversion unit configured to generate pseudo-GPS reception signals including satellite information about a plurality of satellites to allow the base station to acquire time information corresponding to the synchronized internal time information and calculate the position information acquired by the position information acquisition unit or generates pseudo-GPS reception signals including the synchronized internal time information and the satellite information acquired by the satellite information acquisition unit, and a pseudo-GPS reception signal transmission unit configured to output the pseudo-GPS reception signals to the base station. Therefore, even when the base station is installed in a place in which it is difficult to receive GPS signals, the communication system can be realized since the base station can generate the synchronization signals synchronized with the GPS reference time from the pseudo-GPS reception signals. Further, it is advantageous in that the degree of freedom of system construction can be increased.

DETAILED DESCRIPTION

Aspects of embodiments of the present invention will be described with reference to the accompanying drawings.

<Overview of Aspects of Embodiments>

A synchronization signal conversion device according to aspects of embodiments of the present invention includes a first communication device that is installed outdoors and may receive Global Positioning System (GPS) signals and a second communication device that is installed indoors and may not receive GPS signals. The first communication device receives GPS signals to retrieve time synchronization information and wirelessly transmits signals having time synchronization information to the second communication device in a frequency band different from that of the GPS signals, and the second communication device demodulates the received signals to retrieve a time synchronization signal and synchronize internal time information, generates pseudo-GPS reception signals including orbit information of a plurality of satellites and time information corresponding to a transmission time of each satellite in order for a device (e.g., a base station device) at a receiving side equipped with a GPS reception device to be able to acquire the corresponding internal time information, and outputs the pseudo-GPS reception signals to the device at the receiving side. Even when the device at the receiving side is in an environment in which it may be difficult to receive the GPS signals, synchronization signals synchronized with a GPS reference time may be generated based on the pseudo-GPS reception signals, and thus a communication system can be realized and the degree of freedom of system construction can be increased.

Further, the synchronization signal conversion device according to the embodiment of the present invention is not specialized for the system using Long-Term Evolution (LTE)/LTE-Advanced standard or the fifth generation (5G) communication system and is applicable to time synchronization throughout a system including a system synchronization signal synchronized with the GPS reference time without including time information in the broadcast channel information.

Figure 1:
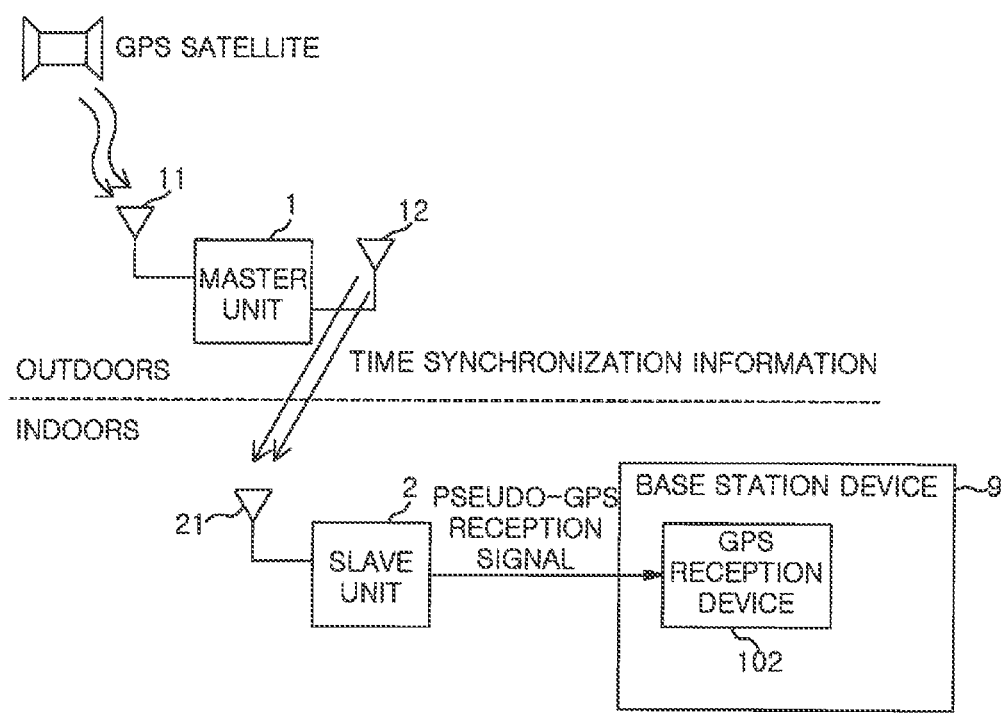
FIG. 1 is an explanatory diagram illustrating a schematic configuration of a first synchronization signal conversion device.

<Schematic Configuration of Synchronization Signal Conversion Device According to First Embodiment: FIG. 1>

FIG. 1 is an explanatory diagram illustrating a schematic configuration of a synchronization signal conversion device (a first synchronization signal conversion device) according to a first embodiment of the present invention.

As illustrated in FIG. 1, the first synchronization signal conversion device includes a first communication device (hereinafter, referred to as a "master unit") 1 installed outdoors at a position at which GPS signals may be received, and a second communication device (hereinafter, referred to as a "slave unit") 2 installed indoors at a position at which GPS signals may not be received.

Figure 9:
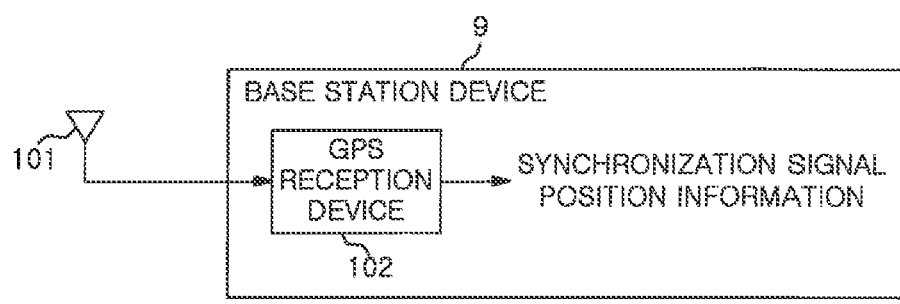
FIG. 9 is an explanatory diagram illustrating a schematic configuration of a base station device equipped with a Global Positioning System (GPS) reception device.

In addition, in the first synchronization signal conversion device, the slave unit 2 is connected to a base station device 9 equipped with a GPS reception device 102 as illustrated in FIG. 9 and outputs pseudo-GPS reception signals to the base station device 9.

Specifically, the master unit 1 installed outdoors includes a receiving antenna 11 that receives GPS signals and a transmitting antenna 12 that transmits radio signals. The master unit 1 acquires time synchronization information synchronized with the GPS reference time from the received GPS signals and transmits radio signals having the corresponding time synchronization information to the slave unit 2 in a frequency band different from that of the GPS signals.

Here, the time synchronization information includes time information and timing information.

The slave unit 2 receives and demodulates the radio signals output from the master unit 1 through a receiving antenna 21, retrieves the time synchronization information synchronized with the GPS reference time to synchronize internal time information of the device (the slave unit 2) with the GPS reference time on the basis of the time synchronization information, generates pseudo-GPS reception signals including information in order for the base station device 9 at the receiving side to acquire (calculate) the corresponding synchronized internal time information, and outputs the pseudo-GPS reception signals to the base station device 9.

The base station device 9 includes the GPS reception device 102 but does not include a GPS antenna. Further, the GPS reception device 102 acquires the time synchronization information synchronized with the GPS reference time by inputting the pseudo-GPS reception signals instead of the GPS reception signals from the first synchronization signal conversion device and generates synchronization signals on the basis of the time synchronization information.

Here, the pseudo-GPS reception signals generated by the synchronization signal conversion device of the present invention are signals generated so that the GPS reception device 102 of the connected base station device 9 may acquire accurate time synchronization information synchronized with Coordinated Universal Time (UTC) and desired position information. That is, the pseudo-GPS reception signals are signals including time information synchronized with the GPS reference time, orbit information corresponding to a plurality of satellites and time information corresponding to a transmission time of each satellite similar to the case of receiving the GPS signals from the plurality of satellites.

That is, when the pseudo-GPS reception signals are input, the GPS reception device 102 of the base station device 9 recognizes that the GPS signals from the plurality of satellites are superimposed and input so as to perform the same operation as the case in which the original GPS reception signals are input.

Further, here, the "time synchronization information synchronized with the GPS reference time" is used interchangeably with the "time synchronization information synchronized with the UTC."

Figure 2:
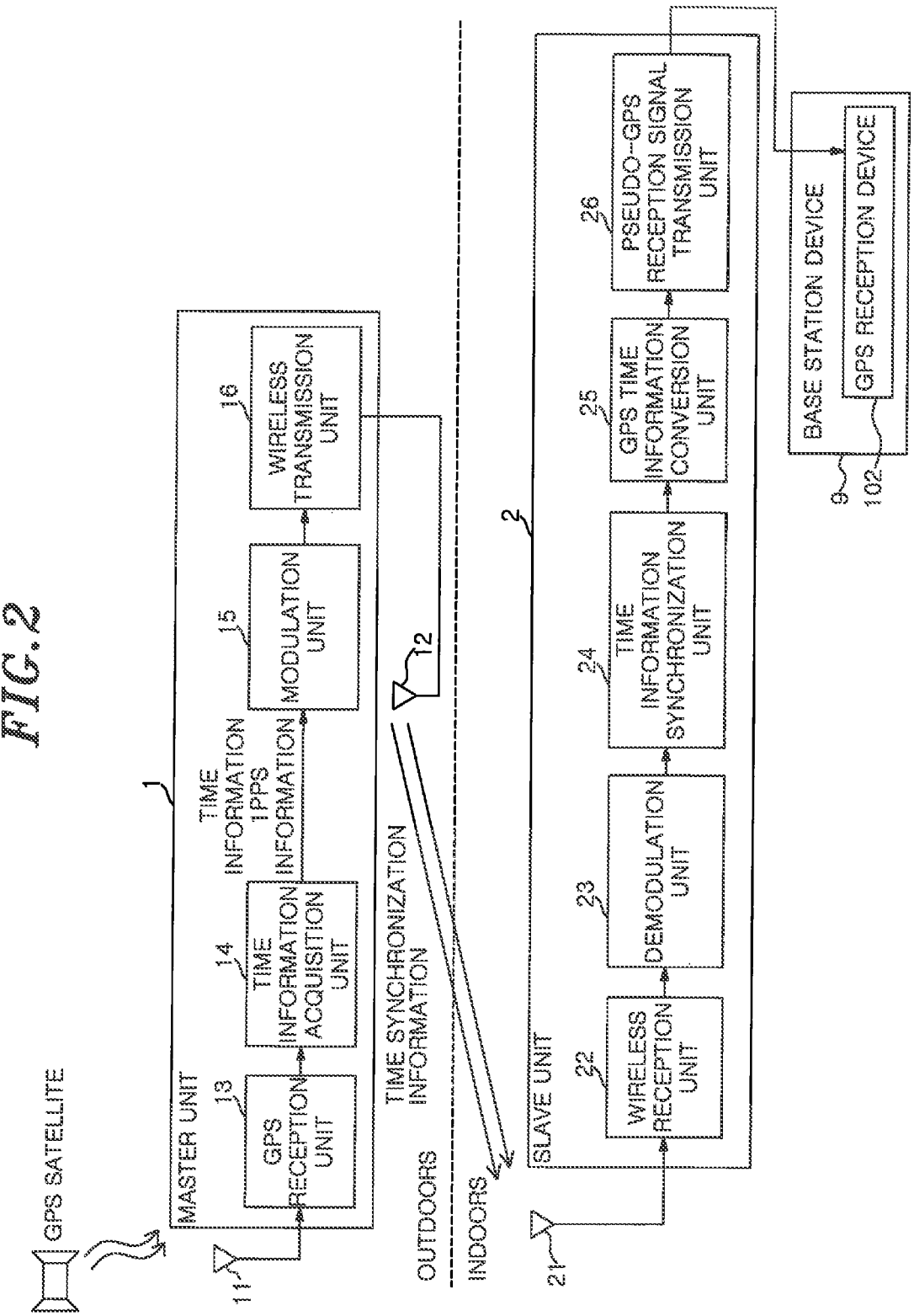
FIG. 2 is a block diagram illustrating a configuration of the first synchronization signal conversion device.

<Configuration of First Synchronization Signal Conversion Device: FIG. 2>

A configuration of the first synchronization signal conversion device will be described with reference to FIG. 2.

FIG. 2 is a block diagram illustrating the configuration of the first synchronization signal conversion device. As illustrated in FIG. 2, the master unit 1 of the first synchronization signal conversion device includes a receiving antenna 11, a GPS reception unit 13, a time information acquisition unit 14, a modulation unit 15, a wireless transmission unit 16, and a transmitting antenna 12.

Further, the slave unit 2 of the first synchronization signal conversion device includes a receiving antenna 21, a wireless reception unit 22, a demodulation unit 23, a time information synchronization unit 24, a GPS time information conversion unit 25, and a pseudo-GPS reception signal transmission unit 26.

<Master Unit 1>

Each unit of the master unit 1 of the first synchronization signal conversion device will be described.

The receiving antenna 11 is an antenna that receives radio waves from GPS satellites like the GPS antenna 101 of the base station device 9 illustrated in FIG. 9. A GPS signal has a frequency of 1.5 GHz.

The GPS reception unit 13 receives and demodulates signals in which GPS signals transmitted from a plurality of GPS satellites are superimposed.

The time information acquisition unit 14 acquires time information and 1 pulse per second (PPS) information from the demodulated GPS reception signals. Here, the acquired time information and 1 PPS information are synchronized with the GPS reference time.

The modulation unit 15 modulates the time information and the 1 PPS information (that are referred to as pieces of time synchronization information) acquired by the time information acquisition unit 14 and outputs the modulated time information and 1 PPS information to the wireless transmission unit 16. That is, the time synchronization information acquired by the master unit 1 includes information about the GPS reference time and the 1 PPS information.

The wireless transmission unit 16 wirelessly outputs signals having the time synchronization information from the transmitting antenna 12 at a wireless frequency different from a frequency of the GPS signals. The transmission frequency of the signals transmitted from the master unit 1 to the slave unit 2 may be in a band that does not require a license, or in a band that requires a license if there is a license. Here, a frequency lower than that of the GPS signal is used.

<Slave Unit 2>

The slave unit 2 includes the receiving antenna 21, the wireless reception unit 22, the demodulation unit 23, the time information synchronization unit 24, the GPS time information conversion unit 25, and the pseudo-GPS reception signal transmission unit 26.

The receiving antenna 21 receives radio signals transmitted from the master unit 1.

The wireless reception unit 22 performs frequency conversion of the radio signals and outputs the radio signals.

The demodulation unit 23 demodulates the received signals and retrieves time synchronization information. Specifically, the demodulation unit 23 retrieves and outputs the 1 PPS signal and the time information that are synchronized with the GPS reference time.

The time information synchronization unit 24 synchronizes internal time information in the device with the GPS reference time on the basis of the time information and the 1 PPS signal transmitted from the demodulation unit 23 and outputs the internal time information synchronized with the GPS reference time. A configuration and an operation of the time information synchronization unit 24 will be described below.

The GPS time information conversion unit 25 generates pseudo-GPS reception signals on the basis of the internal time information synchronized with the GPS reference time, which is input from the time information synchronization unit 24, and pre-stored position information.

Further, a position information setting unit may be provided in the slave unit 2 so that the position information setting unit sets position information input from the outside in the GPS time information conversion unit 25.

Specifically, the GPS time information conversion unit 25 pseudo-calculates the GPS signals from the plurality of satellites to correspond to the internal time information synchronized with the GPS reference time and the position information and generates GPS reception signals (pseudo-GPS reception signals) as if the plurality of GPS signals are superimposed.

As described above, the pseudo-GPS reception signals include the corresponding internal time information and also the orbit information of the plurality of satellites and the time information corresponding to the transmission time received from each satellite that allow the device at the receiving side equipped with the GPS reception device to reflect the stored (or set) position information. Therefore, the GPS reception device 102 of the base station device 9 acquires the time information identical to the internal time information synchronized with the GPS reference time on the basis of the received pseudo-GPS reception signals and generates synchronization signals while calculating positions.

Further, the pseudo-GPS signals are similar to signals generated by a GPS simulator used to test the GPS reception device and are described, for example, in "Keysight Technologies GPS Receiver Test" by Keysight Technologies Joint Stock Company, issued Jan. 6, 2015.

The pseudo-GPS reception signal transmission unit 26 outputs the pseudo-GPS reception signals output from the GPS time information conversion unit 25 to the connected base station device 9.

<Operation of First Synchronization Signal Conversion Device: FIGS. 1 and 2>

An operation of the first synchronization signal conversion device will be briefly described with reference to FIGS. 1 and 2.

In the first synchronization signal conversion device, when the receiving antenna 11 of the master unit 1 receives GPS signals, the time information acquisition unit 14 acquires time information and 1 PPS information that are GPS time synchronization information. Further, the corresponding time information and 1 PPS information are modulated by the modulation unit 15 at a frequency different from that of the GPS signals and is wirelessly transmitted from the wireless transmission unit 16 to the slave unit 2.

Further, in the slave unit 2, the receiving antenna 21 receives the radio signals, the demodulation unit 23 acquires the time information and the 1 PPS information that are the GPS time synchronization information, and the time information synchronization unit 24 synchronizes the internal time information with the received time information.

Further, the GPS time information conversion unit 25 generates pseudo-GPS reception signals in which the corresponding internal time information synchronized with the GPS reference time and the position information stored in an internal memory are calculated, and the pseudo-GPS reception signal transmission unit 26 outputs the corresponding pseudo-GPS reception signals to the base station device 9.

Through the above process, the operation of the first synchronization signal conversion device is performed.

Figure 3:
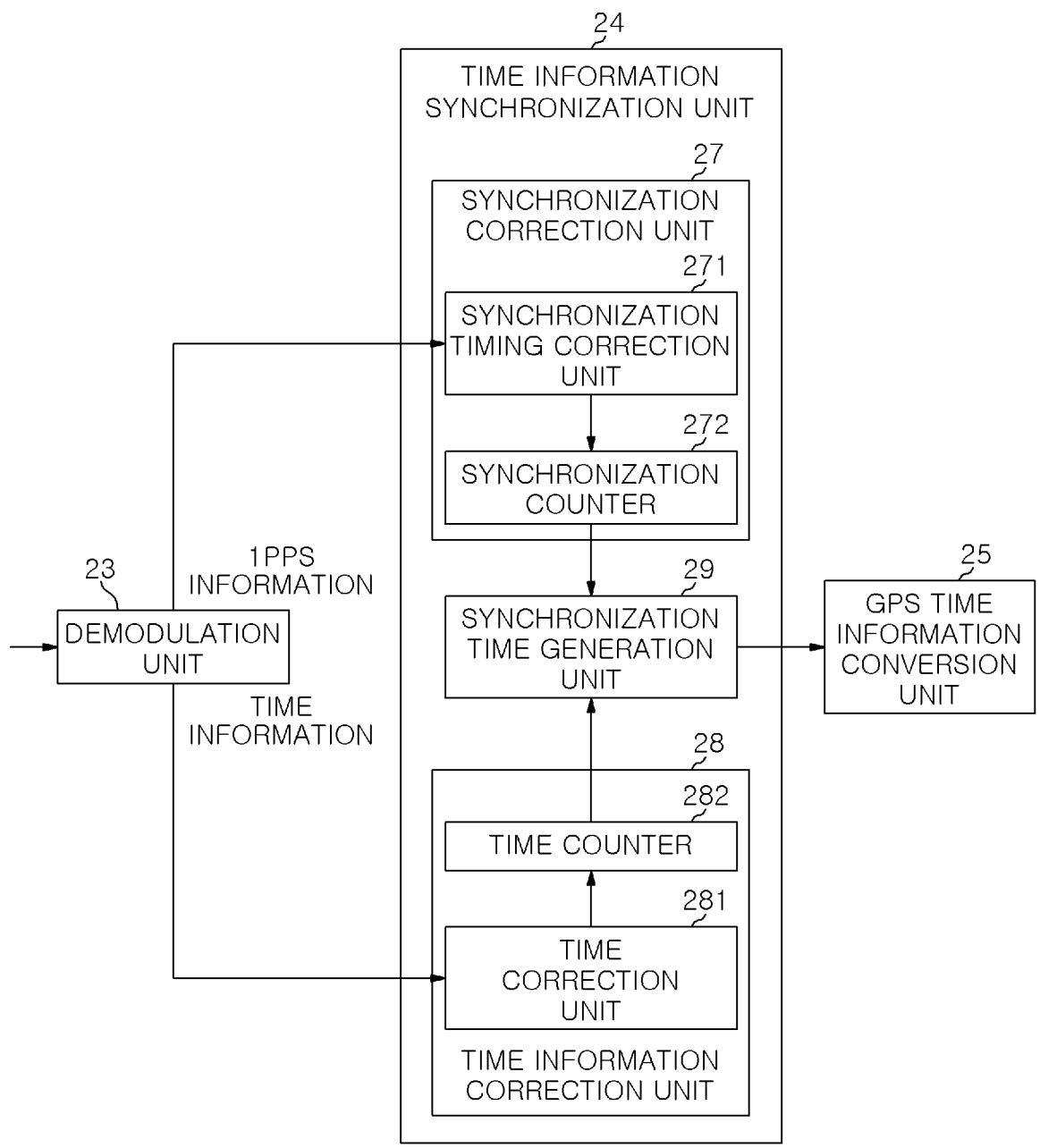
FIG. 3 is a block diagram illustrating a configuration of a time information synchronization unit.

<Configuration of Time Information Synchronization Unit: FIG. 3>

Next, a configuration of the time information synchronization unit 24 will be described with reference to FIG. 3. FIG. 3 is a block diagram illustrating the configuration of the time information synchronization unit 24.

As illustrated in FIG. 3, the time information synchronization unit 24 includes a synchronization correction unit 27, a time information correction unit 28, and a synchronization time generation unit 29.

The time information synchronization unit 24 may basically perform a self-propelled operation on the basis of an internal clock, and the synchronization time generation unit 29 may output the time information from the time information correction unit 28 according to the timing from the synchronization correction unit 27 to generate the time information (the internal time information) synchronized with the GPS reference time.

Further, in the time information synchronization unit 24, when 1 PPS information is input from the demodulation unit 23, the synchronization correction unit 27 performs timing correction, and when time information is input from the demodulation unit 23, the time information correction unit 28 corrects the internal time information.

Since the time information synchronization unit 24 performs the self-propelled operation, even when radio signals may not be received from the master unit 1, the internal time information may be output seamlessly.

Each unit of the time information synchronization unit 24 will be described in detail.

The synchronization correction unit 27 includes a synchronization timing correction unit 271 and a synchronization counter 272.

The synchronization timing correction unit 271 performs timing correction on the synchronization counter 272 on the basis of the 1 PPS signal input from the demodulation unit 23 and instructs the synchronization counter 272 to count timing when the 1 PPS signal is input.

Specifically, the synchronization timing correction unit 271 determines whether the 1 PPS signal is normally received, and when it is determined that the 1 PPS signal is normally received, the synchronization timing correction unit 271 updates the timing of the synchronization counter 272 according to the 1 PPS signal.

The synchronization counter 272 is a frequency generation circuit including a voltage-controlled crystal oscillator (VCXO), a temperature compensated crystal oscillator (TCXO), or the like and generates a self-propelled signal (a self-propelled clock) that counts timing.

Here, the synchronization counter 272 outputs the synchronization timing (timing signal) each second on the basis of the self-propelled clock. Further, when the instruction for counting the timing is input from the synchronization timing correction unit 271, the synchronization counter 272 generates the synchronization timing each second with the corresponding timing as a starting point.

As a result, when the self-propelled state is maintained in a long period of time and the synchronization timing generated by the synchronization counter 272 is mismatched, the self-propelled state and the synchronization timing may be corrected.

That is, when the 1 PPS signal is normally input, the 1 PPS timing signal synchronized with the GPS reference time is output from the synchronization counter 272.

The time information correction unit 28 includes a time correction unit 281 and a time counter 282.

The time correction unit 281 determines whether the time information extracted from the radio signals is normally received using the demodulation unit 23, and when it is determined that the time information extracted from the radio signals is normally received, the time correction unit 281 updates a counter value of the time counter 282 with the acquired time information.

The time counter 282 is a frequency generation circuit including a VCXO or a TCXO, and generates a self-propelled clock. Thus, the time counter 282 generates and outputs independent time information.

Further, when the time information is input from the time correction unit 281, the time counter 282 updates the counter value with the input time information (time information acquired from the master unit 1).

Therefore, when the time information from the master unit 1 is normally input, the time information synchronized with the GPS reference time is output from the time counter 282 as the counter value.

The synchronization time generation unit 29 maintains the counter value input from the time information correction unit 28 and outputs, when the 1 PPS timing signal synchronized with the GPS reference time is input from the synchronization correction unit 27, the maintained counter value as the internal time information according to the corresponding timing.

Therefore, the internal time information synchronized with the GPS reference time is output from the synchronization time generation unit 29 each second.

Then, the internal time information synchronized with the GPS reference time, which is generated by the time information synchronization unit 24, is converted along with the pre-stored position information into appropriate pseudo-GPS reception signals by the GPS time information conversion unit 25, and the pseudo-GPS reception signals are output from the pseudo-GPS reception signal transmission unit 26 to the base station device 9.

Therefore, in the base station device 9, the GPS reception device 102 calculates a time coincident with information about the GPS reference time to generate the synchronization signals, and also calculates the position information on the basis of the received pseudo-GPS reception signals.

Through the above process, even in an environment in which it may be difficult to receive the GPS signals, the base station device 9 may generate the synchronization signals synchronized with the GPS reference time, thereby realizing a wireless communication system of which time is synchronized with that of the GPS.

<Effects of First Synchronization Signal Conversion Device>

According to the first synchronization signal conversion device, in the master unit 1 installed outdoors, the receiving antenna 11 receives the GPS signals; the time information acquisition unit 14 acquires the time synchronization information including information about the GPS reference time and the 1 PPS information; the modulation unit 15 converts the time synchronization information at a frequency different from that of the GPS signals and transmits the time synchronization information to the slave unit 2 installed indoors through the wireless transmission unit 16 and the antenna 12. Further, in the slave unit 2, the demodulation unit 23 demodulates the received signals and acquires the information about the GPS reference time and the 1 PPS signal; the time information synchronization unit 24 synchronizes the internal time information with the received information about the GPS reference time; the GPS time information conversion unit 25 generates the pseudo-GPS reception signals including the orbit information of the plurality of satellites and the transmission time information so that the same time as the corresponding internal time information is acquired at the receiving side; and the pseudo-GPS reception signal transmission unit 26 outputs the pseudo-GPS reception signals to the base station device 9 equipped with the GPS reception device 102. Therefore, even in an environment in which it may be difficult to receive the GPS signals, the base station device 9 can calculate the time information synchronized with the GPS reference time from the pseudo-GPS reception signals to thereby generate the synchronization signals, and realize the wireless communication system synchronized with the GPS.

Figure 4:
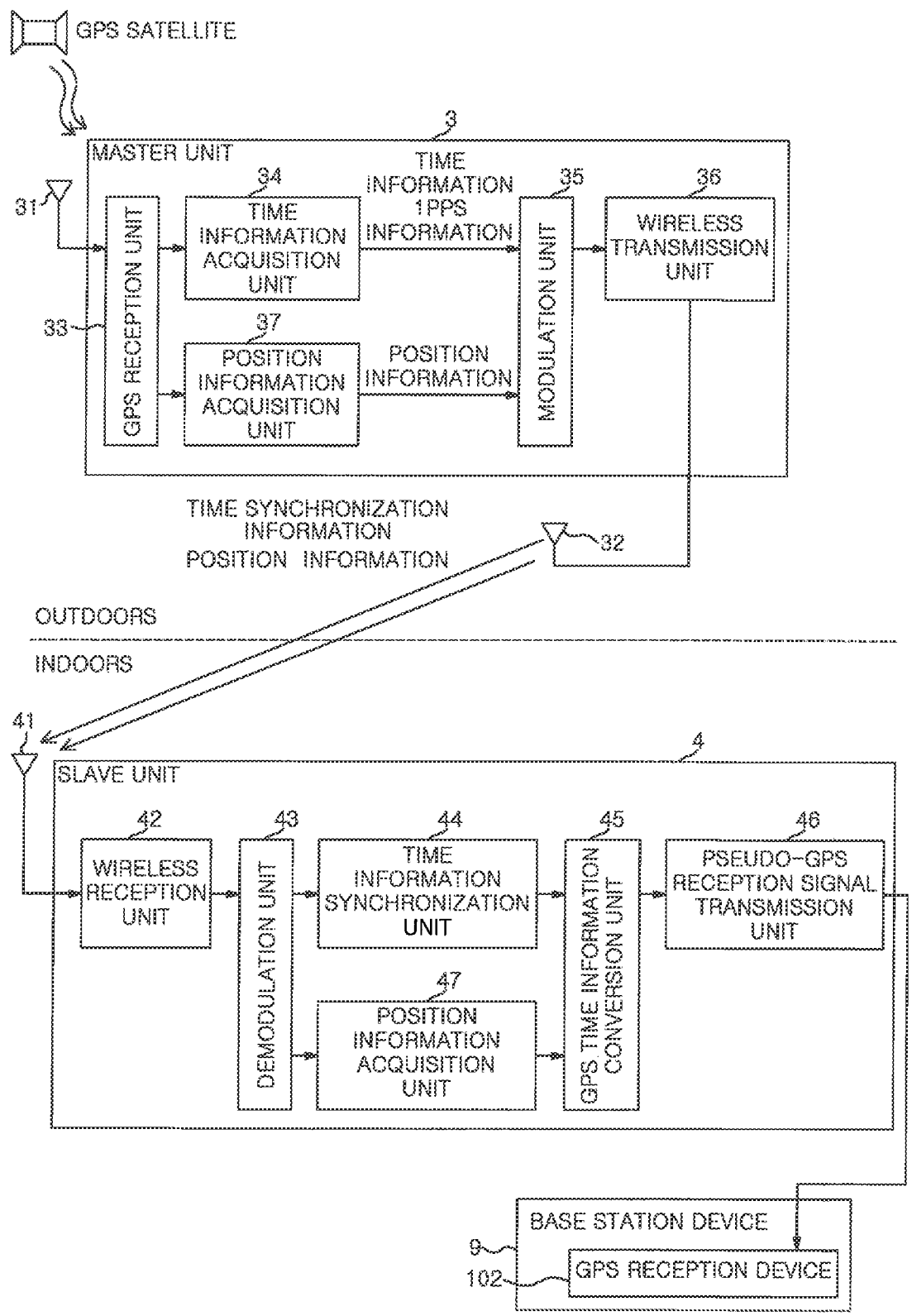
FIG. 4 is a block diagram illustrating a configuration of a second synchronization signal conversion device.

<Synchronization Signal Conversion Device According to Second Embodiment: FIG. 4>

Next, a synchronization signal conversion device (a second synchronization signal conversion device) according to a second embodiment of the present invention will be described with reference to FIG. 4. FIG. 4 is a block diagram illustrating a configuration of the second synchronization signal conversion device.

In the second synchronization signal conversion device, a master unit that receives GPS signals acquires not only time information but also position information from GPS reception signals and transmits the position information in addition to the time synchronization information to a slave unit.

As illustrated in FIG. 4, similar to the first synchronization signal conversion device, the second synchronization signal conversion device includes a first communication device (a master unit) 3 installed outdoors that is an environment in which GPS signals may be received and a second communication device (a slave unit) 4 installed in an environment in which GPS signals may not be received so as to provide pseudo-GPS reception signals to a base station device 9 installed in an environment in which it may be difficult to receive the GPS signals.

Similar to the master unit 1 of the first synchronization signal conversion device, the master unit 3 of the second synchronization signal conversion device includes a receiving antenna 31, a GPS reception unit 33, a time information acquisition unit 34, a modulation unit 35, a wireless transmission unit 36, and a transmitting antenna 32. In addition, the master unit 3 includes a position information acquisition unit 37 that is a different feature of the second synchronization signal conversion device.

The position information acquisition unit 37 acquires position information from GPS reception signals output from the GPS reception unit 33. The position information is, for example, latitude and longitude information.

That is, the position information acquired by the position information acquisition unit 37 is information corresponding to a position where the master unit 3 is installed.

Similar to the slave unit of the first synchronization signal conversion device, the slave unit 4 of the second synchronization signal conversion device includes a receiving antenna 41, a wireless reception unit 42, a demodulation unit 43, a time information synchronization unit 44, a GPS time information conversion unit 45, and a pseudo-GPS reception signal transmission unit 46. In addition, the slave unit 4 includes a position information acquisition unit 47 that is a different feature of the second synchronization signal conversion device.

The position information acquisition unit 47 of the slave unit 4 acquires position information (latitude and longitude information) from signals output from the demodulation unit 43 and outputs the position information to the GPS time information conversion unit 45.

The GPS time information conversion unit 45 generates pseudo-GPS reception signals including orbit information of a plurality of satellites and transmission time information so that the base station device 9 at a receiving side calculates the corresponding position information in addition to the time information identical to the internal time information.

<Operation of Second Synchronization Signal Conversion Device: FIG. 4>

Hereinafter, a specific operation related to the position information in the entire operation of the second synchronization signal conversion device will be mainly described. Further, since an operation related to the time information is the same as that of the first synchronization signal conversion device, a description thereof will be omitted.

In the second synchronization signal conversion device, the master unit 3 receives and demodulates GPS signals, the position information acquisition unit 37 acquires position information, the modulation unit 35 modulates time synchronization information and the position information, and the wireless transmission unit 36 transmits the time synchronization information and the position information from a transmitting antenna to the slave unit 4 as radio signals.

Further, the slave unit 4 receives the radio signals from the master unit 3, the demodulation unit 43 demodulates the radio signals, the position information acquisition unit 47 acquires the position information, the GPS time information conversion unit 45 generates pseudo-GPS reception signals so that the base station device 9 at the receiving side may calculate the internal time information synchronized with the GPS reference time and the corresponding position information, and the pseudo-GPS reception signal transmission unit 46 outputs the pseudo-GPS reception signals to the base station device 9.

In the second synchronization signal conversion device, the slave unit 4 may generate the pseudo-GPS reception signals on the basis of the position information acquired from the GPS signals in the master unit 3, and thus the position information of the master unit 3 may be reflected to the base station device 9.

<Effects of Second Synchronization Signal Conversion Device>

According to the second synchronization signal conversion device, the master unit 3 includes the position information acquisition unit 37 so that the position information acquisition unit 37 acquires the position information in addition to the time synchronization information from the GPS reception signals, the wireless transmission unit 36 wirelessly transmits the time synchronization information and the position information to the slave unit 4 at a frequency different from that of the GPS signals, the time information synchronization unit 44 of the slave unit 4 generates the internal time information synchronized with the GPS reference time on the basis of the time synchronization information, the position information acquisition unit 47 acquires the position information from the received signals, and the GPS time information conversion unit 45 generates the pseudo-GPS reception signals on the basis of the internal time information and the corresponding position information. Therefore, even when the base station device 9 is installed in a place in which it is difficult to receive GPS signals, the base station device 9 can calculate the time information synchronized with the GPS reference time from the pseudo-GPS reception signals and generate the synchronization signals, and further, the accurate position information of the master unit 3 can be reflected to the base station device 9.

Figure 5:
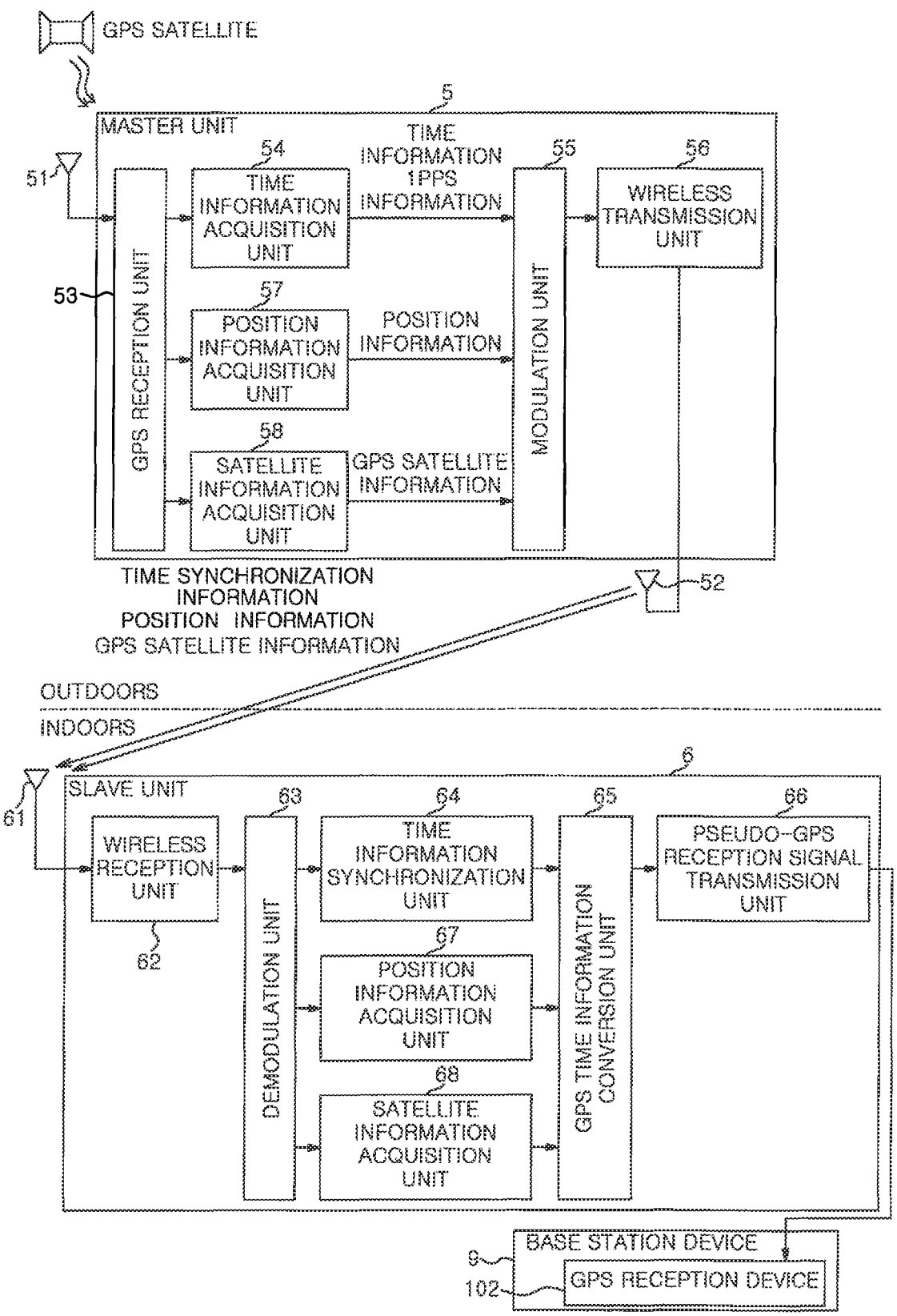
FIG. 5 is a block diagram illustrating a configuration of a third synchronization signal conversion device.

<Configuration of Synchronization Signal Conversion Device According to Third Embodiment: FIG. 5>

Next, a synchronization signal conversion device (a third synchronization signal conversion device) according to a third embodiment of the present invention will be described with reference to FIG. 5. FIG. 5 is a block diagram illustrating a configuration of the third synchronization signal conversion device.

As illustrated in FIG. 5, the third synchronization signal conversion device includes a configuration that acquires and uses satellite information from GPS reception signals in addition to the configuration of the second synchronization signal conversion device and includes a first communication device (a master unit) 5 and a second communication device (a slave unit) 6.

A different feature of the third synchronization signal conversion device will be mainly described.

The master unit 5 of the third synchronization signal conversion device includes a satellite information acquisition unit 58 in addition to the configuration of the master unit 3 of the second synchronization signal conversion device.

Similarly, the slave unit 6 of the third synchronization signal conversion device includes a satellite information acquisition unit 68 in addition to the configuration of the slave unit 4 of the second synchronization signal conversion device.

Since the remaining configuration thereof is the same as those of the second synchronization signal conversion device, descriptions thereof will be omitted.

The satellite information acquisition unit 58 of the master unit 5 of the third synchronization signal conversion device retrieves satellite information such as navigation data or the like from GPS reception signals from a GPS reception unit 53 and outputs the satellite information to a modulation unit 55 as GPS satellite information.

In addition, the satellite information acquisition unit 68 of the slave unit 6 retrieves GPS satellite information such as navigation data or the like from signals demodulated by a demodulation unit 63 and outputs the GPS satellite information to a GPS time information conversion unit 65.

The GPS time information conversion unit 65 of the slave unit 6 receives internal time information from a time information synchronization unit 64 and the position information transmitted from the master unit 5 and generates pseudo-GPS reception signals in which the corresponding time and position information are calculated.

<Operation of Third Synchronization Signal Conversion Device: FIG. 5>

An operation of the third synchronization signal conversion device will be described with reference to FIG. 5.

In the third synchronization signal conversion device, the master unit 5 receives and demodulates GPS signals, a time information acquisition unit 54 acquires time synchronization information (information about GPS reference time and 1 PPS information), a position information acquisition unit 57 acquires position information, the satellite information acquisition unit 58 acquires satellite information such as navigation data or the like, the modulation unit 55 modulates the time synchronization information, the position information, and the GPS satellite information, and a wireless transmission unit 56 transmits the time synchronization information, the position information, and the GPS satellite information from a transmitting antenna to the slave unit 6 as radio signals.

Further, in the slave unit 6, the demodulation unit 63 receives and demodulates the radio signals from the master unit 5, a position information acquisition unit 67 acquires the position information, the time information synchronization unit 64 generates the internal time information synchronized with the GPS reference time, the satellite information acquisition unit 68 acquires the GPS satellite information, the GPS time information conversion unit 65 generates pseudo-GPS reception signals, in which the corresponding position information is calculated, on the basis of the corresponding internal time information and the position information, and a pseudo-GPS reception signal transmission unit 66 outputs the pseudo-GPS reception signals to the base station device 9.

Further, the base station device 9 acquires the time information synchronized with the GPS reference time on the basis of the pseudo-GPS reception signals output from the slave unit 6 and calculates position information identical to the position information transmitted from the master unit 5.

<Another Third Synchronization Signal Conversion Device>

Here, another third synchronization signal conversion device will be described. Since another third synchronization signal conversion device has the same configuration as the third synchronization signal conversion device described above, it will be described with reference to FIG. 5, but an operation of a slave unit 6 is partially different.

A GPS time information conversion unit 65 of the slave unit 6 of another third synchronization signal conversion device generates pseudo-GPS reception signals including internal time information output from a time information synchronization unit 64 and GPS satellite information output from a satellite information acquisition unit 68.

In this case, the GPS time information conversion unit 65 does not generate pseudo satellite information in which position information received from the master unit 5 is calculated.

Since the base station device 9 calculates position information on the basis of the received GPS satellite information from the slave unit 6, a position information acquisition unit 57 of the master unit 5 and a position information acquisition unit 67 of the slave unit 6 may not be required.

That is, in another third synchronization signal conversion device, the GPS time information conversion unit of the slave unit 6 generates pseudo-GPS reception signals including synchronization time information transmitted from the master unit 5 and GPS satellite information, a pseudo-GPS reception signal transmission unit 66 transmits the pseudo-GPS reception signals to the base station device 9, and the base station device 9 acquires time information from the received pseudo-GPS reception signals and, at the same time, calculates position information on the basis of the navigation data.

<Effects of Third Synchronization Signal Conversion Devices>

According to the third synchronization signal conversion device, the master unit 5 includes the satellite information acquisition unit 58 so that the satellite information acquisition unit 58 acquires the GPS satellite information such as navigation data or the like in addition to the time synchronization information from the GPS reception signals, the wireless transmission unit 56 wirelessly transmits the time synchronization information, the position information, and the GPS satellite information to the slave unit 6 at a frequency different from that of the GPS signals, the time information synchronization unit of the slave unit 6 generates an internal time information synchronized with the GPS reference time on the basis of the time synchronization information, the position information acquisition unit 67 acquires the position information from the received signals, the satellite information acquisition unit 68 acquires the GPS satellite information from the received signals, and the GPS time information conversion unit 45 generates the pseudo-GPS reception signals including any one of the internal time information and the position information or the GPS satellite information and outputs the pseudo-GPS reception signals to the base station device 9. Therefore, even when the base station device 9 is installed in a place in which it may be difficult to receive the GPS signals, the base station device 9 may acquire the time information synchronized with the GPS reference time from the pseudo-GPS reception signals and generate the synchronization signals, and further, acquire the position information transmitted from the master unit 5 or acquire the position information that is the same as that of the master unit 5 on the basis of the GPS satellite information received by the master unit 5.

Further, according to the third synchronization signal conversion device, when the slave unit 6 transmits the pseudo-GPS signals using the satellite information transmitted from the master unit 5, the process of calculating the navigation data of the plurality of satellites or the transmission time from the satellites for calculating target time information and position information to the base station device 9 at the receiving side becomes unnecessary, and thus the load of the slave unit 6 can be significantly reduced.

However, in the third synchronization signal conversion devices, the amount of information transmitted from the master unit 5 to the slave unit 6 may be increased, and thus operation may not be realized depending on communication capacity in some cases.

Figure 6:
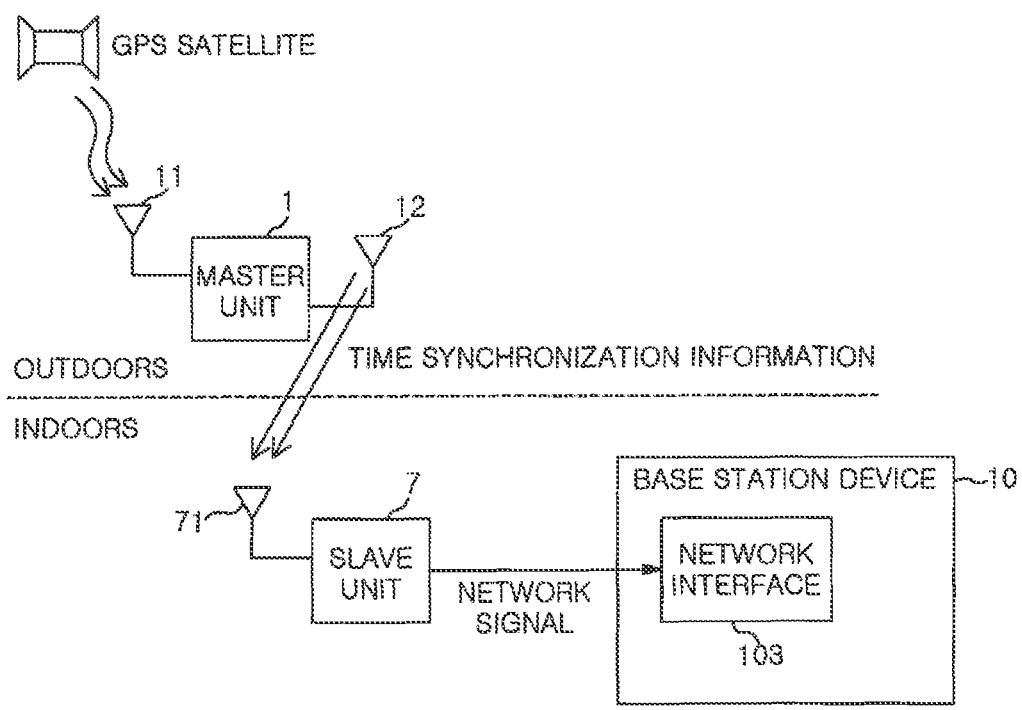
FIG. 6 is an explanatory diagram showing a schematic configuration of a fourth synchronization signal conversion device.

<Schematic Configuration of Fourth Synchronization Signal Conversion Device: FIG. 6>

Next, a synchronization signal conversion device (a fourth synchronization signal conversion device) according to a fourth embodiment of the present invention will be described with reference to FIG. 6. FIG. 6 is an explanatory diagram showing a schematic configuration of the fourth synchronization signal conversion device.

As illustrated in FIG. 6, the fourth synchronization signal conversion device includes a master unit 1 installed in an environment in which GPS signals may be received and a slave unit 7 installed in an environment in which GPS signals may not be received, and the fourth synchronization signal conversion device provides time information synchronized with the GPS reference time to a base station device 10 installed in an environment in which GPS signals may not be received via a specific wired network (e.g., the Institute of Electrical and Electronics Engineers (IEEE) 1588).

Here, the base station device 10 includes an interface (a network interface) 103 of the specific wired network (e.g., IEEE 1588).

Further, the fourth synchronization signal conversion device converts internal time information synchronized with the GPS reference time into a network synchronization signal and transmits the network synchronization signal to the base station device 10.

Figure 7:
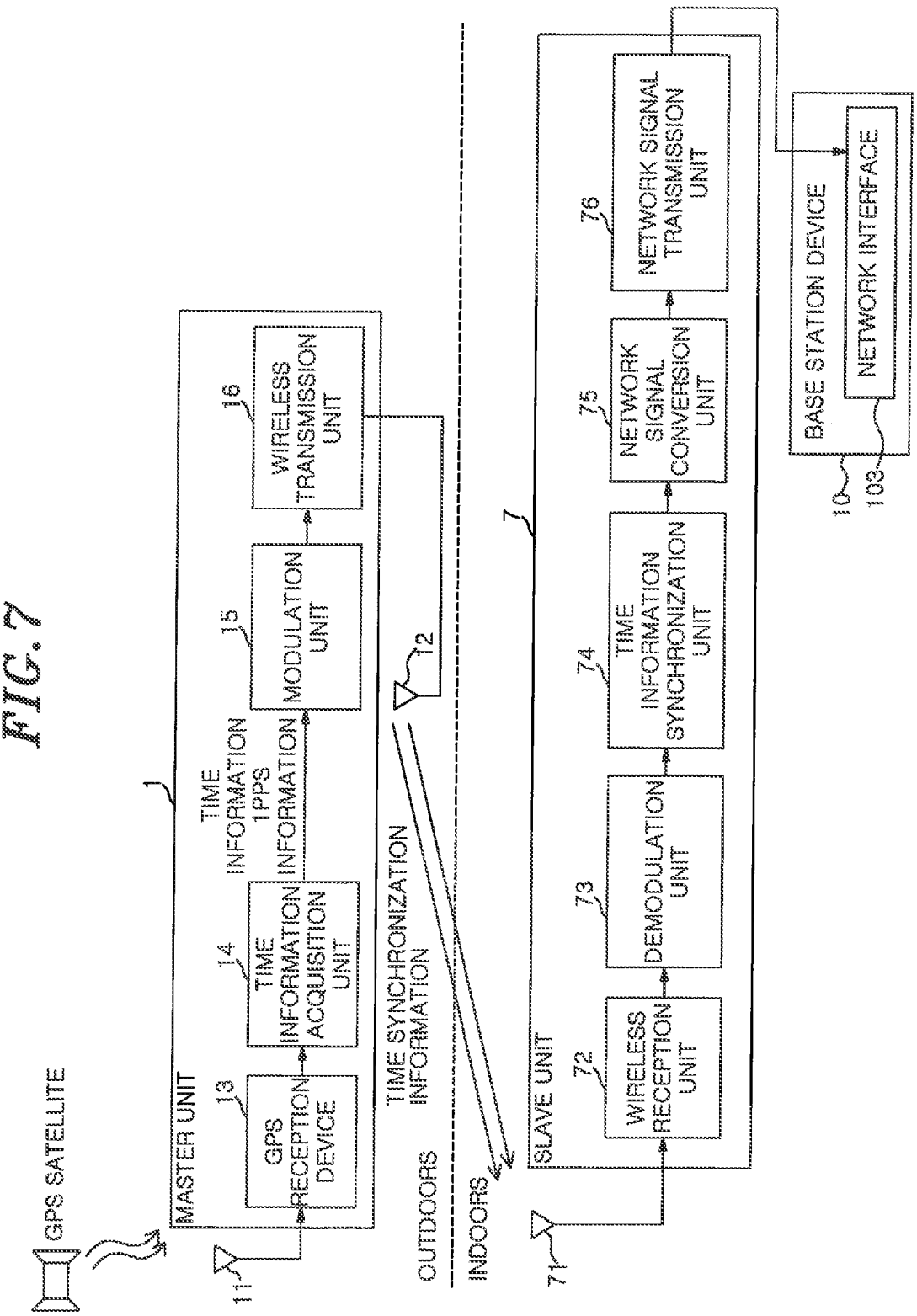
FIG. 7 is a block diagram illustrating a configuration of the fourth synchronization signal conversion device.

<Configuration of Fourth Synchronization Signal Conversion Device: FIG. 7>

A configuration of a fourth synchronization signal conversion device will be described with reference to FIG. 7. FIG. 7 is a block diagram illustrating the configuration of the fourth synchronization signal conversion device.

As illustrated in FIG. 7, the fourth synchronization signal conversion device includes the master unit 1 of the first synchronization signal conversion device, and a slave unit 7 that is a different feature of the fourth synchronization signal conversion device. A description of the master unit 1 will be omitted.

The slave unit 7 receives time synchronization information from the master unit 1 as radio signals and generates internal time information synchronized with the GPS reference time similar to the slave unit 2 of the first synchronization signal conversion device. However, the slave unit 7 generates and outputs network signals including the corresponding internal time information to the base station device 10.

The slave unit 7 includes a receiving antenna 71, a wireless reception unit 72, a time information synchronization unit 74, a network signal conversion unit 75, and a network signal transmission unit 76.

Here, since the receiving antenna 71, the wireless reception unit 72, and a demodulation unit 73 have the same configuration and operation as those of the slave unit 2 of the first synchronization signal conversion device, descriptions thereof will be omitted.

A different feature of the slave unit 7 of the fourth synchronization signal conversion device will be described.

Internal time information synchronized with the GPS reference time output from the time information synchronization unit 74 is input to the network signal conversion unit 75, and the network signal conversion unit 75 converts the internal time information into information having a predetermined format conforming to a network standard such as IEEE 1588 or the like, and generates network signals including the corresponding internal time information.

The network signal transmission unit 76 transmits the network signals from the network signal conversion unit 75 to the base station device 10.

The base station device 10 extracts the internal time information from the network signals received through the network interface 103, and generates synchronization signals (reference clock) from the corresponding internal time information to realize communication.

Therefore, even when the base station device 10 is not equipped with a GPS reception device and is installed in an environment in which network signals according to IEEE 1588 or the like may not be received, the base station device 9 can extract the time information synchronized with the GPS reference time from the network signals and generate a reference clock.

<Effects of Fourth Synchronization Signal Conversion Device>

According to the fourth synchronization signal conversion device, the master unit 1 receives the GPS signals, acquires the time synchronization information synchronized with the GPS reference time, and wirelessly transmits the time synchronization information at a frequency different from that of the GPS signals. Further, the slave unit 7 receives and demodulates the radio signals from the master unit 1, the time information synchronization unit 74 synchronizes the internal time information with the GPS reference time on the basis of the time synchronization information, the network signal conversion unit 75 generates the network signals including the internal time information conforming to the network format according to IEEE 1588 or the like, and the network signal transmission unit 76 outputs the corresponding network signals to the base station device 10 equipped with the network interface 103. Therefore, even when the base station device 10 is installed in an environment in which network signals according to IEEE 1588 or the like may not be received, the base station device 9 can receive the network signals from the fourth synchronization signal conversion device to thereby extract the synchronization time information synchronized with the GPS reference time, and use the synchronization time information as a reference clock. Thus, the degree of freedom of system construction can be increased.

Figure 8:
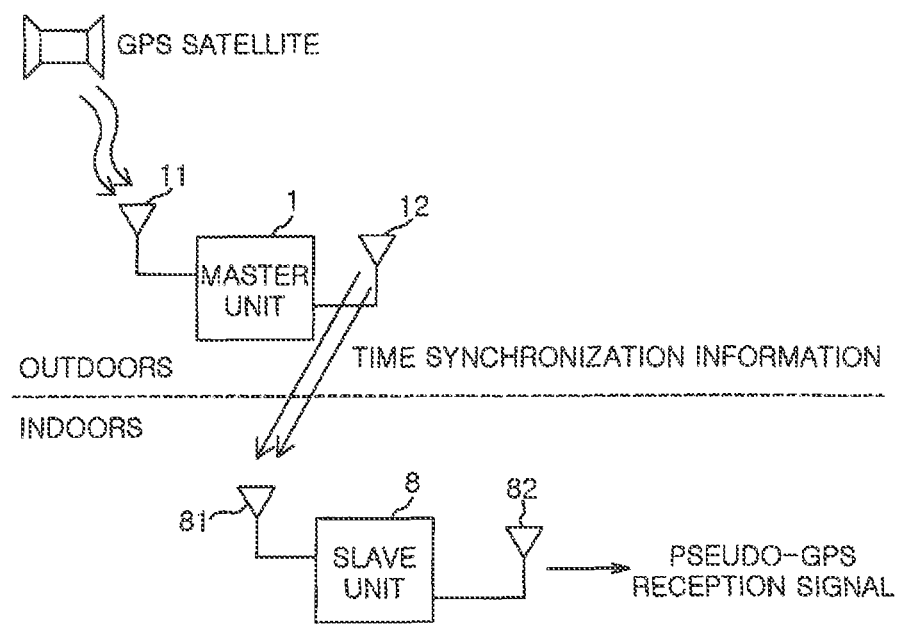
FIG. 8 is an explanatory diagram illustrating a schematic configuration of a fifth synchronization signal conversion device.

<Fifth Synchronization Signal Conversion Device: FIG. 8>

Next, a synchronization signal conversion device (a fifth synchronization signal conversion device) according to a fifth embodiment of the present invention will be described with reference to FIG. 8. FIG. 8 is an explanatory diagram illustrating a schematic configuration of the fifth synchronization signal conversion device.

As illustrated in FIG. 8, the fifth synchronization signal conversion device includes the master unit 1 of the first synchronization signal conversion device, and a slave unit 8 that is a different feature of the fifth synchronization signal conversion device.

Further, the slave unit of the fifth synchronization signal conversion device is a configuration equipped with a transmitting antenna 82 that transmits pseudo-GPS reception signals in a wireless manner.

Further, the master unit 2 of the second synchronization signal conversion device may be used instead of the master unit 1, and thus position information may also be transmitted.

A specific configuration of the slave unit 8 is omitted, but a wireless transmission unit is provided instead of the pseudo-GPS reception signal transmission unit 26 of the configuration of the slave unit 2 illustrated in FIG. 2.

Further, the slave unit 8 of the fifth synchronization signal conversion device demodulates radio signals received from the master unit 1 to retrieve time synchronization information, synchronizes internal time information with the GPS reference time on the basis of time synchronization information, and generates pseudo-GPS reception signals for which time information identical to the corresponding internal time information is calculated. The wireless transmission unit modulates the pseudo-GPS reception signals and the transmitting antenna 82 transmits the modulated pseudo-GPS reception signals as radio signals.

Here, when the slave unit 8 transmits the pseudo-GPS reception signals, the slave unit 8 may use signals having a frequency different from a frequency of 1.5 GHz of the GPS signals. Alternatively, a transmission level may be (slightly) reduced while using the frequency of 1.5 GHz identical to that of the original GPS signals.

Further, in the fifth synchronization signal conversion device, although the slave unit of the first synchronization signal conversion device is described as the configuration that wirelessly outputs the pseudo-GPS reception signals, the slave unit of each of the second synchronization signal conversion device and the third synchronization signal conversion device may be configured to wirelessly output the pseudo-GPS reception signals.

<Effects of Fifth Synchronization Signal Conversion Device>

According to the fifth synchronization signal conversion device, the master unit 1 receives the GPS signals, acquires the time synchronization information synchronized with the GPS reference time, and wirelessly transmits the time synchronization information at a frequency different from that of the GPS signals. Further, the slave unit 8 receives and demodulates the radio signals from the master unit 1, synchronizes the internal time information with the GPS reference time on the basis of the time synchronization information, generates the pseudo-GPS reception signals including the corresponding internal time information and the orbit information of the plurality of satellites and the transmission time, and outputs the pseudo-GPS reception signals to the device at a receiving side equipped with the GPS reception device as radio signals to allow the device at the receiving side to acquire the same time information as the corresponding internal time information. Therefore, even when the device is installed in an environment in which it may be difficult to receive the GPS signals, the device can receive the pseudo-GPS reception signals from the fifth synchronization signal conversion device, extract the synchronization time information synchronized with the GPS reference time, and use the pseudo-GPS reception signals as a reference clock. Thus, the degree of freedom of system construction can be increased.

<Synchronization Signal Conversion Device Including Base Station Device Equipped with Slave Unit>

In the above-described first to fourth embodiments, the synchronization signal conversion devices are described as the synchronization signal conversion device being connected to the base station of the wireless communication system, but it may be possible to configure base station devices including the slave unit of any of the above-described synchronization signal conversion devices.

Since all of the above-described synchronization signal conversion devices may provide accurate time information, the above-described synchronization signal conversion devices may be installed inside a base station device of a public system in addition to a base station device of a local network such as a self-managed system or the like.

Further, each of the slave units installed inside the base station devices receives information such as time synchronization information and the like from the master unit, the slave units of the first to third synchronization signal conversion devices output the pseudo-GPS reception signals to the GPS reception device, and the slave unit of the fourth synchronization signal conversion device outputs the network signals including the synchronization time information synchronized with the GPS reference time to the network interface.

This application claims priority to Japanese Patent Application No. 2018-168533, filed on Sep. 10, 2018, the entire contents of which are incorporated herein by reference.

INDUSTRIAL APPLICABILITY

The present invention is particularly suitable for a synchronization signal conversion device that allows a system using time information synchronized with a GPS reference time to be constructed even in a region in which it may be difficult to receive the GPS signals, thereby increasing the degree of freedom of system construction.

EXPLANATION OF REFERENCE NUMERALS

1, 3, 5: master unit
2, 4, 6, 7, 8: slave unit
9, 10: base station device
11, 31, 51: receiving antenna
101: GPS antenna
12, 52: transmitting antenna
13, 33, 53: GPS reception unit
14, 34, 54: time information acquisition unit
15, 35, 55: modulation unit
16, 36, 56: wireless transmission unit
37, 47: position information acquisition unit
21, 41, 61, 71, 81: receiving antenna
22, 42, 62: wireless reception unit
23, 63: demodulation unit
24, 64: time information synchronization unit
25, 45, 65: GPS time information conversion unit
26, 46, 66: pseudo-GPS reception signal transmission unit
27: synchronization correction unit
28: time information correction unit
29: synchronization time generation unit
58, 68: satellite information acquisition unit
75: network signal conversion unit
76: network signal transmission unit
102: GPS reception device
103: network interface
271: synchronization timing correction unit
272: synchronization counter
281: time correction unit
282: time counter

What is claimed is:

1. A synchronization signal conversion device comprising:
a first communication device; and
a second communication device, the second communication device being connected to a reception device of a base station,
wherein the first communication device includes
a Global Positioning System (GPS) receiver that receives GPS signals,
a time information acquisition processor configured to acquire time synchronization information synchronized with a GPS reference time from the received GPS signals, and
a wireless transmitter configured to transmit radio signals having the time synchronization information at a frequency different from that of the GPS signals, and
wherein the second communication device includes
a wireless receiver configured to receive the radio signals transmitted from the first communication device,
a time information synchronization processor configured to synchronize internal time information in the second communication device with the GPS reference time on the basis of the time synchronization information included in the received radio signals,
a GPS time information memory and processor configured to store specific position information in advance and generate pseudo-GPS reception signals including satellite information about a plurality of satellites to allow the base station to acquire time information corresponding to the synchronized internal time information and calculate the specific position information, and
a pseudo-GPS reception signal transmitter configured to output the pseudo-GPS reception signals to the base station.

2. A synchronization signal conversion device comprising:
a first communication device; and
a second communication device, the second communication device being connected to a reception device of a base station,
wherein the first communication device includes
a Global Positioning System (GPS) receiver that receives GPS signals,
a time information acquisition processor configured to acquire time synchronization information synchronized with a GPS reference time from the received GPS signals,
a position information acquisition processor configured to calculate position information from the received GPS signals, and
a wireless transmitter configured to transmit radio signals having the time synchronization information and the position information at a frequency different from that of the GPS signals, and
wherein the second communication device includes
a wireless receiver configured to receive the radio signals transmitted from the first communication device,
a time information synchronization processor configured to synchronize internal time information in the second communication device with the GPS reference time on the basis of the time synchronization information included in the received radio signals,
a position information acquisition processor configured to acquire the position information included in the received radio signals,
a GPS time information processor configured to generate pseudo-GPS reception signals including satellite information about a plurality of satellites to allow the base station to acquire time information corresponding to the synchronized internal time information and calculate the position information acquired by the position information acquisition unit, and
a pseudo-GPS reception signal transmitter configured to output the pseudo-GPS reception signals to the base station.

3. A synchronization signal conversion device comprising:
a first communication device; and
a second communication device, the second communication device being connected to a reception device of a base station,
wherein the first communication device includes a Global Positioning System (GPS) receiver that receives GPS signals,
a time information acquisition processor configured to acquire time synchronization information synchronized with a GPS reference time from the received GPS signals,
a position information acquisition processor configured to calculate position information from the received GPS signals,
a satellite information acquisition processor configured to acquire satellite information from the received GPS signals, and
a wireless transmitter configured to transmit radio signals having the time synchronization information, the position information, and the satellite information at a frequency different from that of the GPS signals, and
wherein the second communication device includes
a wireless receiver configured to receive the radio signals transmitted from the first communication device,
a time information synchronization processor configured to synchronize internal time information in the second communication device with the GPS reference time on the basis of the time synchronization information included in the received radio signals,
a position information acquisition processor configured to acquire the position information included in the received signals,
a satellite information acquisition unit configured to acquire the satellite information included in the received signals,
a GPS time information conversion processor configured to generate pseudo-GPS reception signals including satellite information about a plurality of satellites to allow the base station to acquire time information corresponding to the synchronized internal time information and calculate the position information acquired by the position information acquisition unit or generates pseudo-GPS reception signals including the synchronized internal time information and the satellite information acquired by the satellite information acquisition unit, and
a pseudo-GPS reception signal transmitter configured to output the pseudo-GPS reception signals to the base station.

4. The synchronization signal conversion device of claim 1, wherein the second communication device is installed inside the base station.

5. The synchronization signal conversion device of claim 2, wherein the second communication device is installed inside the base station.

6. The synchronization signal conversion device of claim 3, wherein the second communication device is installed inside the base station.

7. The synchronization signal conversion device of claim 1, wherein the second communication device wirelessly transmits the pseudo-GPS reception signals to the base station.

8. The synchronization signal conversion device of claim 2, wherein the second communication device wirelessly transmits the pseudo-GPS reception signals to the base station.

9. The synchronization signal conversion device of claim 3, wherein the second communication device wirelessly transmits the pseudo-GPS reception signals to the base station.

* * * * *